United States Patent
Maroulis et al.

(10) Patent No.: US 6,584,094 B2
(45) Date of Patent: *Jun. 24, 2003

(54) TECHNIQUES FOR PROVIDING TELEPHONIC COMMUNICATIONS OVER THE INTERNET

(75) Inventors: Serafim Maroulis, Belford, NJ (US); Mahendra Pratap, Cliffwood Beach, NJ (US); Dennis W. Specht, Sparta, NJ (US)

(73) Assignee: Avaya Technology Corp., Basking Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/713,050

(22) Filed: Sep. 12, 1996

(65) Prior Publication Data

US 2003/0081590 A1 May 1, 2003

(51) Int. Cl.⁷ .............................................. H04L 12/66
(52) U.S. Cl. ........................ 370/352; 370/522; 379/900
(58) Field of Search ................................. 370/400, 401, 370/410, 522, 524, 230, 389, 352, 356, 355; 379/229–232, 900

(56) References Cited

U.S. PATENT DOCUMENTS

| | | | | |
|---|---|---|---|---|
| 5,604,737 A | * | 2/1997 | Iwami et al. ................ 370/352 |
| 5,608,786 A | * | 3/1997 | Gordon ....................... 370/401 |
| 5,790,548 A | * | 8/1998 | Sistanizadeh ................ 370/401 |
| 6,078,579 A | * | 6/2000 | Weingarten | |
| 6,324,280 B2 | * | 11/2001 | Dunn et al. ................. 370/352 |

* cited by examiner

Primary Examiner—Steven Nguyen

(57) ABSTRACT

Improved methods for providing a voice communications path over the internet. According to a first embodiment, a first PBX coupled to a first internet gateway device determines whether or not a second PBX has access to a second internet gateway device and, if so, the second PBX sends the IP (internet protocol) address of the second internet gateway device to the first PBX, and the first PBX sends the IP address of the first internet gateway device to the second PBX, over the PSTN (public switched telephone network) and/or over a network signalling channel. The first and second internet gateway devices then set up a voice communications path over the internet between the first and second PBXes.

15 Claims, 3 Drawing Sheets

TECHNIQUES FOR PROVIDING TELEPHONIC COMMUNICATIONS OVER THE INTERNET

BACKGROUND OF THE INVENTION

1. Field of the Invention

The invention relates generally to communications technology, and more particularly to techniques for placing telephone calls over the internet.

2. Description of Related Art

Various techniques have been developed for the purpose of carrying telephonic communications over the internet. Some of these techniques require the use of an internet voice communications software package and voice processing hardware, both of which are typically installed on the user's personal computer. In response to commands issued by the user, the voice communications software package establishes a communications link on the internet with a remote personal computer selected by the user, as described above. The voice communications software package then controls the voice processing hardware to provide a bidirectional voice communications link between the user and the remote personal computer. Voice processing hardware is available in the form of a voice card which is inserted into an expansion slot of an existing personal computer.

Other types of internet telephony systems, including those presently available from VocalTech/Dialogic, as well as from Vienna Systems, employ gateway devices implemented using personal computers (PCs). The gateway devices use static routing tables which map each of a plurality of respective conventional PSTN telephone numbers to corresponding IP (internet protocol) addresses. Routing table entries must be added and/or removed manually by the user. The gateway utilized in the VocalTech/Dialogic system requires the user to dial out to a special PBX extension corresponding to a local gateway. After calling that PBX extension, the user waits for dial tone, presses the "*" key, and dials the code for the destination PBX, followed by the destination extension telephone number. One disadvantage of this scheme is that the user must know ahead of time that the equipment at the destination telephone number includes a gateway for interfacing a PBX to the internet. Additionally, the user is required to know the special telephone number for reaching this PBX.

SUMMARY OF THE INVENTION

Improved methods are disclosed for providing a voice communications path over the internet. According to a first embodiment, a first PBX coupled to a first internet gateway device determines whether or not a second PBX has access to a second internet gateway device and, if so, the second PBX sends the IP (internet protocol) address of the second internet gateway device to the first PBX, and the first PBX sends the IP address of the first internet gateway device to the second PBX, over the PSTN (public switched telephone network) and/or over a network signalling channel. The first and second internet gateway devices then set up a voice communications path over the internet between the first and second PBXes.

A further embodiment is for use with a system that includes a first PBX coupled to a first internet gateway device and to a first POTS telephone. The first PBX is equipped to establish a communications path with a second PBX over the PSTN (public switched telephone network), and/or over a network signaling channel. The second PBX is coupled to the second POTS telephone. The method commences when, in response to a telephone number entered into the first POTS telephone and corresponding to a second PBX, the first PBX establishes a signalling path to the second PBX. The first PBX constructs a request packet which includes the IP (internet protocol) address of the first PBX, the IP address of the first internet gateway device, and the telephone number dialed into the first POTS telephone. The first PBX sends the request packet to the second PBX over the PSTN, and/or over the network signaling channel. In response to the receipt of the request packet, the second PBX checks to determine whether or not it is coupled to a second internet gateway. If so, the second PBX constructs a response packet including the IP address of the second gateway, and sends the response packet to the first PBX over the PSTN, and/or over the network signaling channel. Upon receipt of the response packet, the first PBX sends a reservation signal to the first gateway device and, in response to the reservation signal, the first gateway device requests the internet to provide two internet channels between the first gateway and the second gateway. These internet channels provide a voice communications path between the first POTS telephone and the second POTS telephone, wherein the path includes the first PBX, the first gateway device, the internet, the second gateway device, and the second PBX.

DETAILED DESCRIPTION OF THE PREFERRED EMBODIMENTS

Figure 1:
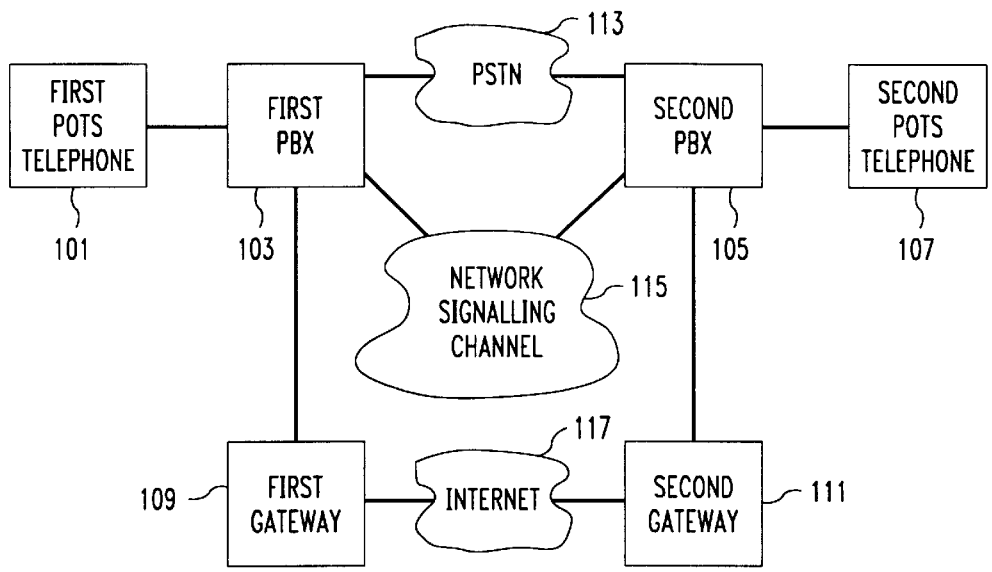
FIG. 1 is a hardware block diagram showing an illustrative operational environment for the invention.

Refer to FIG. 1, which is a hardware configuration setting forth an illustrative operational environment for the invention. A first POTS telephone 101 and a first gateway 109 are coupled to a first PBX 103. The first PBX 103 is equipped to establish a communications pathway over PSTN 113 (public switched telephone network), and/or over network signaling channel 115. The first gateway 109 is equipped to establish a communications pathway over internet 117. A second POTS telephone 107 and a second gateway 111 are coupled to a second PBX 105. The second PBX 105 is equipped to establish a communications pathway over PSTN 113 and/or network signaling channel 115, and the second gateway is equipped to establish a communications pathway over internet 117.

Although FIG. 1 shows a first POTS telephone 101 and a second POTS telephone 107, this is for purposes of illustration, it being understood that other types of endpoint devices could be used instead of, or in addition to, first POTS telephone 101 and/or second POTS telephone 107. Examples of such endpoint devices are facsimile (fax) machines, video conferencing equipment, DTMF (dualtone, multi-frequency) telephones, and/or various other types of devices which are capable of interfacing with a PBX (private branch exchange).

Conventional, well-known devices may be used to implement first PBX 103, second PBX 105, PSTN 113, network signaling channel 115, and internet 117. First gateway 109 and/or second gateway 111 may be implemented using any of a variety of personal computing devices, such as, for example, a personal computer (PC) equipped with a 386 processor or better (i.e., 486, Pentium, 586, etc.).

Pursuant to an embodiment of the invention disclosed herein, techniques are disclosed wherein a first PBX 103 coupled to a first gateway 109 determines whether nor not a second PBX 105 is coupled to a second gateway 111 by using a first communications path including PSTN 115 and/or network signaling channel 115. If the second PBX is, indeed, coupled to a second gateway 111, the first PBX 103 sends its IP (internet protocol) address to the second PBX 105 over the first communications path, and the second PBX 105 sends its IP address to the first PBX 103 over the first communications path. A second communications path is established between the first PBX 103 and the second PBX 105 that includes the first gateway 109, the internet 117, and the second gateway 111. According to a further embodiment disclosed herein, the second communications path includes two conventional internet channels.

The technique described in the immediately preceding paragraph is advantageous in that the capabilities of the existing telephone network, including PSTN 113 and network signaling channel 115, are leveraged. To the extent that PSTN 113 is employed to exchange information between the first and second PBXes 103, 105, respectively, toll charges are kept to a minimum, because this information is of short duration, as it includes IP addresses and/or dialed telephone number information. If network signaling channel 115 is used for this purpose, toll charges are avoided altogether. If the first PBX 103 determines that the second PBX 105 is coupled to a second gateway 111, a communications pathway is then established between the first and second PBXes 103, 105 over internet 117, and any communications path over PSTN 113/network signaling channel 115 is now broken, thus avoiding any further toll charges.

As a general matter, network signaling channel 115 may be used whenever first PBX 103 first seeks to establish communications with second PBX 105, and it is not yet known whether or not second PBX is connected to a second gateway 111. In practice, network signaling channel 115 may represent a signaling channel well-known to those skilled in the art as a CCS7 channel (common channeling signal 7), a PBX signaling channel generally known as the Digital Private Network Signaling System (DPNSS), or a proposed PBX signaling scheme known as Qsig. Irrespective of the specific characteristics of network signaling channel 115, this channel is used to convey IP addresses and internet availability information from one PBX to another.

By way of background, three basic classes of signaling are used by existing PSTNs 113 and network signaling channels 115. These three classes are alerting indicators, interoffice trunk signals, and special services signals. Alerting indicators inform customers (i.e., POTS telephone users) of call processing conditions such as ringing signals and busy signals. Interoffice trunk signals are used between switches in a network to exchange information.

There are two general types of trunk signals: supervisory signals, and address signals. Supervisory signals detect variations in the flow of current on tip/ring wire pairs (lines and/or trunks) connected to PSTN 113, such as the line and/or trunk connecting PSTN 113 to first PBX 103. Such current variations are indicative of a POTS telephone going from an off-hook condition to an on-hook condition, and of a POTS telephone going from an on-hook condition to an off-hook condition. Address signals determine the destination of the requested telephone call based upon, for example, DTMF tones entered into a DTMF-equipped POTS telephone.

Interoffice trunk signals are considered as either in-band or out-of-band. In-band signaling involves the transfer of signals over the same circuit as the voice path, and out-of-band signaling involves the transfer of signals over a separate circuit from that of the voice path. In-band signaling is presently being replaced by out-of-band signaling, such as the CCS7 scheme described above, or another scheme referred to as SS7 (signaling system 7).

The third class of signals are special services signals. These signals enable custom telephone features such as 800 toll-free service, call waiting, return call, conference calling, etc.

For purposes of illustration, signaling scenarios involving only out-of-band signaling, such as CCS7 or SS7, will be described in more detail herein. However, it is to be understood that the principles disclosed herein are also applicable to operational environments involving in-band signaling. Referring to the hardware block diagram of FIG. 1, PSTN 113 and network signaling channel 115 may be equipped to implement the CCS7 signaling system. In this case, the combination of PSTN 115 and signaling channel 115 consists of four main components: (1) a switching point, (2) signaling links, (3) a signal transfer point, and (4) a service control point.

The switching point may be conceptualized as a central switching office (CSO) equipped with electronic switches of the type commonly known as the ESS series, i.e., 4ESS, 5ESS, etc. The central office is also equipped with all of the hardware and software necessary to convert interoffice trunk signals into packet messages. The switching point then transmits the packet messages into the CCS7 network. The switching point is part of PSTN 113 shown in FIG. 1.

Signaling links are separate channels that carry packet messages over the CCS7 system. In the example of FIG. 1, this signaling link is represented as network signaling channel 115. Since the packet form of transmission is used, a signaling link can carry messages for many calls at once.

The signal transfer point is a centralized switch that receives and routes packet messages from many switching points. The signal transfer point includes a device for interpreting the address field of a packet to identify the destination of a requested call and then to determine the proper routing for the call. The service control point is a centralized database that stores information necessary to perform special signaling functions.

There are two types of packet messages in the CCS7 system: circuit-related messages and database query messages. Circuit-related messages are used to establish a circuit connection during call processing, and database query messages are used to access data from the service control point. These database query messages are requests to the service control point for data to help implement centralized custom features such as 1-800 services.

The signaling messages used by internet 117 generally differ from those employed by PSTN 113 and network signaling channel 115. Internet 117 uses a protocol known to those skilled in the art as TCP/IP, where TCP refers to transmission control protocol, and IP refers to internet protocol. Internet 117 also uses a control message protocol known as ICMP (internet control message protocol), a protocol known as real-time transport protocol (RTP), and another protocol known, as the resource reservation protocol (RSVP). RTP provides real-time communications over internet 117. The advantages of this protocol include timing reconstruction, loss detection, security, and content identification. RTCP is a protocol which functions as a support for RTP channel control, and RSVP is used in the context of a software application to request a specific quality of service from a communications network. One purpose of RSVP is to reserve resources along a data path connecting a first host and a second host.

Now that an illustrative hardware operational setting, as well as an illustrative data protocol environment, have been characterized, a first embodiment of the invention will be described with reference to the flowchart of FIGS. 2A–2D. A summary of the procedure set forth in this flowchart is as follows. In response to a telephone number dialed into first POTS telephone 101 (FIG. 1) and corresponding to a second PBX 105, first PBX 103 establishes a communications path to the second PBX. The first PBX constructs a request packet which includes the IP (internet protocol) address of the first PBX, the IP address of the first internet gateway device, and the telephone number dialed into the first POTS telephone. The first PBX sends the request packet to the second PBX over the PSTN, and/or over the network signaling channel. In response to the receipt of the request packet, the second PBX checks to determine whether or not it is coupled to a second internet gateway. If so, the second PBX constructs a response packet including the IP address of the second gateway, and sends the response packet to the first PBX over the PSTN, and/or over the network signaling channel. Upon receipt of the response packet, the first PBX sends a reservation signal the first gateway device and, in response to the reservation signal, the first gateway device requests the internet to provide two internet channels between the first gateway and the second gateway. These internet channels are used to provide telephonic communications between the first POTS telephone and the second POTS telephone.

A detailed description of the procedure set forth in FIGS. 2A–2D is now presented. The procedure commences at block 201, where the first POTS telephone 101 (FIG. 1) is placed into an off-hook condition. Next, at block 203 (FIG. 2A), the first PBX 103 detects the off-hook condition of the first POTS telephone. The first PBX then commences a supervision process whereby the first PBX monitors the status of the telephone line coupled to the first POTS telephone. This monitoring is for the purpose of detecting, for example, whether the first POTS telephone is off-hook or on-hook at a particular moment in time. At block 205, the first PBX sends dial tone to the first POTS telephone.

At block 207, the first POTS telephone dials a telephone number corresponding to the second POTS telephone 107 and/or the second PBX 105. This telephone number is subsequently stored in an originating register of the first PBX. At block 209, the first PBX sends a request to the first gateway 109, asking the first gateway to send its IP address to the first PBX. If the IP address of the first gateway 109 is received by the first PBX, program control progresses to block 213 of FIG. 2B. However, if no IP address is received by the first PBX (block 211), the program jumps ahead to block 223, where the first PBX routes the telephone call corresponding to the telephone number dialed at block 207 through the PSTN 113 (FIG. 1).

The affirmative branch from block 209 (FIG. 2A) leads to block 213 (FIG. 2B), where the first PBX 103 (FIG. 1) contacts the second PBX 105, via the PSTN 113 and/or the network signaling channel 115, and based upon the telephone number dialed at block 207. Next (block 215), the first PBX constructs a request packet which includes the telephone number dialed by the first PBX at block 207, and, optionally, the IP address of the first gateway. The first PBX sends a request packet to the second PBX via the PSTN, or via the network signaling channel (block 217). The second PBX receives the request packet from the first PBX, and the second PBX obtains the telephone number dialed by the first POTS telephone from the request packet (block 219).

At block 221 (FIG. 2C), the second PBX performs a test to ascertain whether or not it is coupled to a second gateway 111. If not, the second PBX does not send a response packet to the first PBX and, consequently, the program advances to block 223, where the first PBX routes the telephone call corresponding to the telephone number dialed at block 227 through the PSTN. The affirmative branch from block 221 leads to block 225, where the second PBX constructs an IP response packet including the IP address of the second gateway 111. The second PBX sends the response packet to the first PBX via the network signalling channel, and the program progresses to block 226.

Figure 2A:
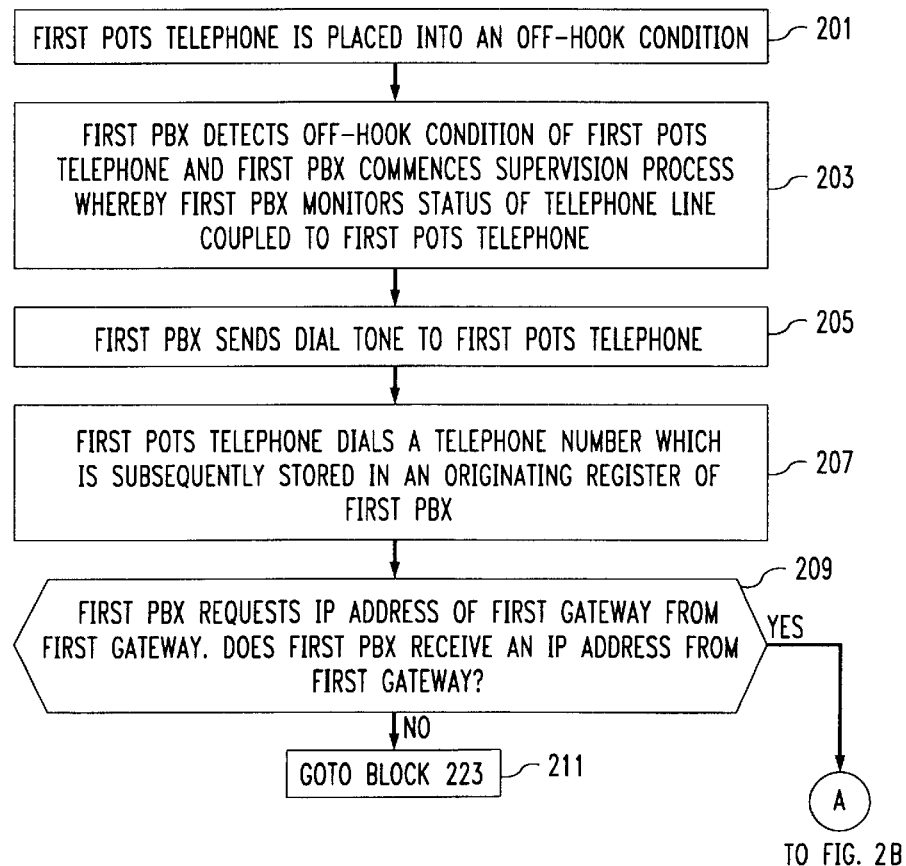
FIGS. 2A–2D together comprise a software flowchart setting forth an illustrative embodiment of the invention.
Figure 2B:
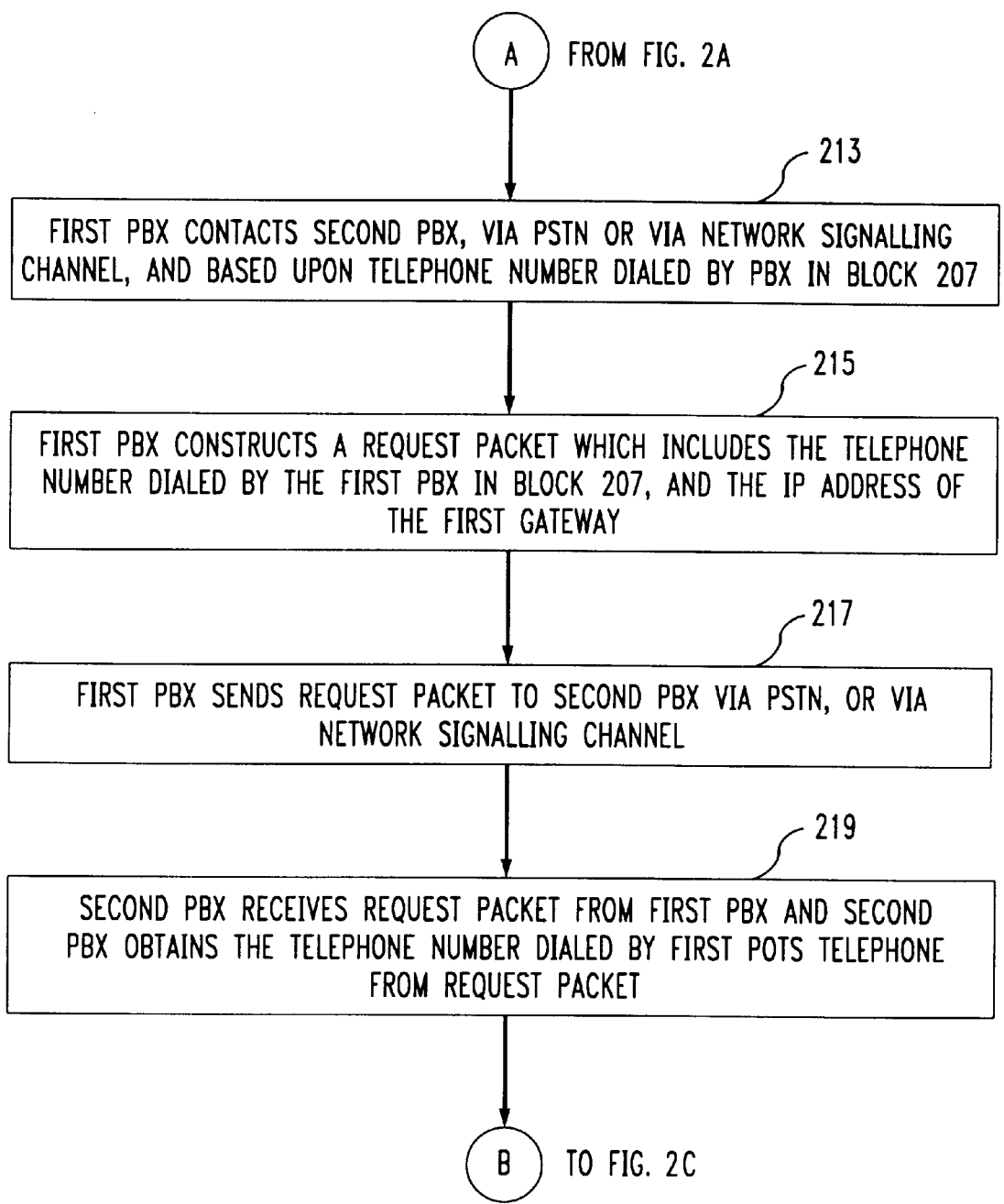
Figure 2C:
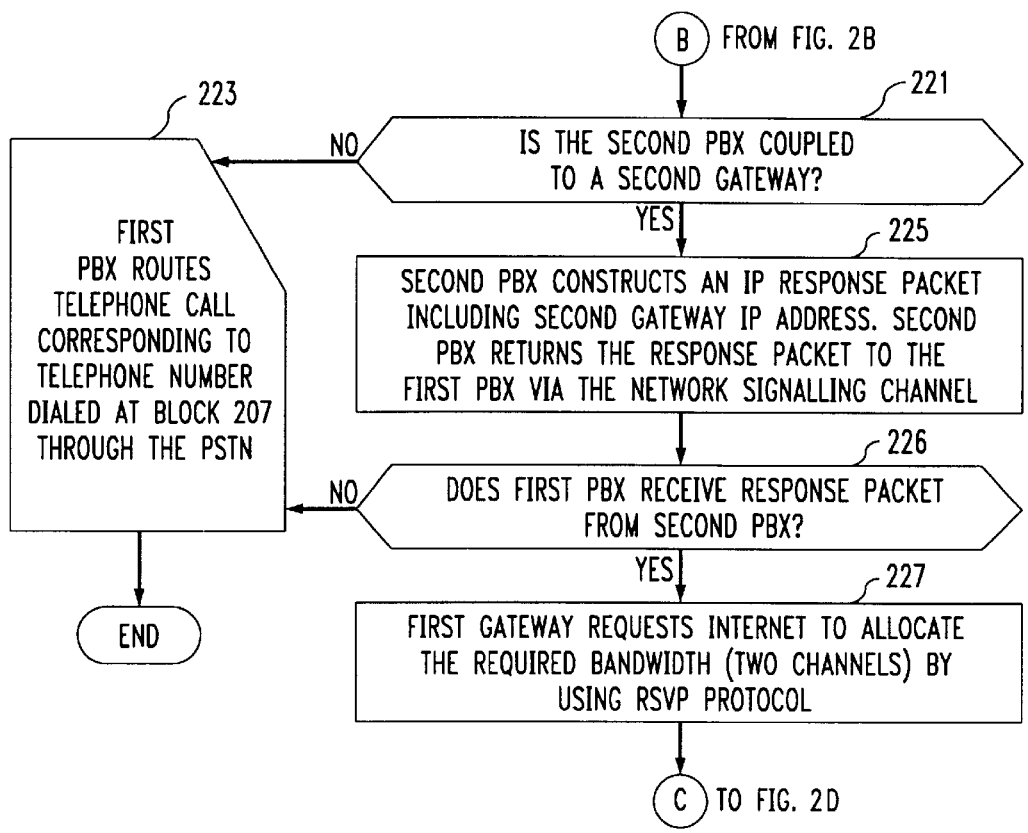
Figure 2D:
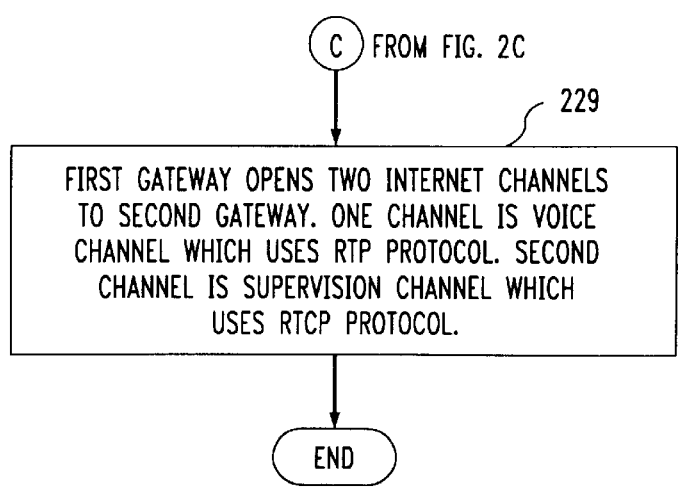

At block 226, the first PBX checks to see whether or not it has received a response packet from the second PBX. If not, the program advances to block 223, described previously. If so, the affirmative branch from block 226 leads to block 227 where the first gateway request the internet 117 (FIG. 1) to allocate a specified bandwidth (by way of example, two internet channels) by using (for purposes of illustration) the RSVP protocol. The first gateway 109 (FIG. 1) opens two internet channels to the second gateway 111 over internet 117 at block 229 (FIG. 2D). A first channel is the voice channel which uses the RTP protocol, and the second channel is the supervision channel which uses the RTCP protocol.

We claim:

1. A method for providing a voice communications path over an internet, including the steps of:
   (a) a first Private Branch Exchange (PBX), coupled to a first internet gateway device, determining whether a second PBX has access to a second internet gateway device;
   (b) and, if the first PBX determines that the second PBX has access to the second internet gateway device, the first PBX sending an IP (internet protocol) address of the first internet gateway device to the second PBX and the second PBX sending an IP address of the second internet gateway device to the first PBX; and (c) establishing the voice communications path over the internet, wherein the IP addresses of the first and second internet gateway devices are sent over at least one of a PSTN (public switched telephone network) and a network signaling channel.

2. The method of claim 1 further including the step of the first and second internet gateway devices setting up the voice communications path over the internet between the first and second PBXes.

3. A method of providing a voice communications path over an internet for use with a system that includes a first Private Branch Exchange (PBX) coupled to a first internet gateway device and to a first POTS (plain old telephone set) telephone, wherein the first PBX is equipped to establish a communications path with a second PBX over at least one of a PSTN (public switched telephone network) and a network signalling channel, and wherein the second PBX is coupled to a second POTS telephone, the method CHARACTERIZED BY the steps of:

(a) in response to a telephone number entered into the first POTS telephone and corresponding to the second PBX, the first PBX establishing a signalling path to the second PBX over at least one of the PSTN and the network signalling channel;

(b) the first PBX constructing a request packet which includes an IP (internet protocol) address to the first PBX, an IP address of the first internet gateway device, and the telephone number dialed into the first POTS telephone;

(c) the first PBX sending the request packet to the second PBX over at least one of the PSTN and the network signalling channel;

(d) in response to a receipt of the request packet, the second PBX determining whether it is coupled to a second internet gateway device;

(e) if the second PBX is coupled to the second internet gateway device, the second PBX constructing a response packet including an IP address of the second internet gateway device, and sending the response packet to the first PBX over at least one of the PSTN and the network signalling channel;

(f) upon receipt of the response packet, the first PBX sending a reservation signal to the first internet gateway device;

(g) in response to the reservation signal, the first internet gateway device requesting the internet to provide the voice communications path between the first internet gateway device and the second internet gateway device.

4. The method of claim 3 wherein the voice communications path of step (g) further includes the first PBX and the second PBX, in addition to the first internet gateway device, the internet, and the second internet gateway device.

5. The method of claim 4 wherein the voice communications path includes two internet channels between the first internet gateway device and the second internet gateway device, and allows voice communications between the first POTS telephone and the second POTS telephone.

6. A method for providing a communications path between a first POTS (plain old telephone set) telephone and a second POTS telephone over an internet, the method for use with a system that includes a first Private Branch Exchange (PBX) coupled to a first internet gateway device and to the first POTS telephone, wherein the first PBX is equipped to establish a communications path with a second PBX over at least one of a PSTN (public switched telephone network) and a network signalling channel, and wherein the second PBX is coupled to the second POTS telephone; the method CHARACTERIZED BY the steps of:

(a) in response to a telephone number entered into the first POTS telephone and corresponding to the second PBX, the first PBX establishing a communications path to the second PBX over at least one of the PSTN and the network signalling channel;

(b) the first PBX constructing a request packet which includes an IP (internet protocol) address of the first PBX, an IP address of the first internet gateway device, and the telephone number dialed into the first POTS telephone;

(c) the first PBX sending the request packet to the second PBX over at least one of the PSTN and the network signalling channel;

(d) in response to a receipt of the request packet, the second PBX determining whether it is coupled to a second internet gateway device;

(e) if the second PBX is coupled to the second internet gateway device, the second PBX constructing a response packet including an IP address of the second internet gateway device, and then sending the response packet to the first PBX over at least one of the PSTN and the network signalling channel;

(f) upon receipt of the response packet, the first PBX sending a reservation signal to the first internet gateway device;

(g) in response to the reservation signal sent by the first PBX, the first internet gateway device requesting the internet to provide two internet channels between the first internet gateway device and the second internet gateway device, wherein the two internet channels are used to provide telephonic communications between the first POTS telephone and the second POTS telephone.

7. A method of providing a voice communication path between a first Private Branch Exchange (PBX) and a second PBX, comprising:

establishing a first communications path between said first PBX and said second PBX using at least one of a PSTN (public switched telephone network) and a network signaling channel;

communicating an Internet Protocol (IP) address of said first PBX from said first PBX to said second PBX via said first communications path; and establishing a second communications path in response to said first PBX receiving an IP address of said second PBX via said first communications path, said second communications path comprising an internet path for enabling said voice communication path.

8. The method of claim 7, wherein said first communications path is the public switched telephone network (PSTN).

9. The method of claim 7, wherein said first communications path is the network signalling channel.

10. The method of claim 9, wherein said network signalling channel carries in-band signalling.

11. The method of claim 9, wherein said network signalling channel carries out-of-band signalling.

12. The method of claim 9, wherein said network signalling channel carries at least one of:
- a common channeling signal 7 (CCS7);
- a Digital Private Network Signalling System (DPNSS); and
- a QSIG channel.

13. A method of providing a voice communication path between a first Private Branch Exchange (PBX) and a second PBX, comprising:
- receiving, at the first PBX, a telephone number from a first POTS (plain old telephone set) telephone;
- constructing a request packet comprising an internet protocol (IP) address of the first PBX, an IP address of a first internet gateway device, and the telephone number received from the first POTS telephone;
- communicating the request packet via at least one of a PSTN (public switched telephone network) and a network signaling channel, said request packet adapted for delivery to the second PBX;
- receiving, via at least one of the PSTN and the network signaling channel, a response packet including an IP address of a second internet gateway device; and
- sending a reservation signal to the first internet gateway device, said reservation signal adapted to cause the first internet gateway device to request an internet to provide two internet channels between the first internet gateway device and the second internet gateway device, wherein the two internet channels are used to provide telephonic communications between the first POTS telephone and a second POTS telephone associated with the second PBX.

14. The method of claim 13, wherein said network signaling channel carries out-of-band signaling.

15. The method of claim 13, wherein said network signaling channel carries at least one of a common channeling signal 7 (CCS7), a Digital Private Network Signaling System (DPNSS), and a QSIG channel.

* * * * *